United States Patent [19]
Siddiqui et al.

[11] Patent Number: 6,117,532
[45] Date of Patent: Sep. 12, 2000

[54] INTERDRAW PRETREATMENT FOR POLYESTER FILM

[75] Inventors: Junaid Ahmed Siddiqui, Richmond; Cornell Chappell, Jr, Petersburg, both of Va.

[73] Assignee: E. I. du Pont de Nemours and Company, Wilmington, Del.

[21] Appl. No.: 08/960,651

[22] Filed: Oct. 30, 1997

[51] Int. Cl.[7] .......................... B32B 27/08; B32B 27/18; B32B 27/20; B32B 27/36
[52] U.S. Cl. .......................... 428/216; 428/214; 428/215; 428/336; 428/339; 428/353; 428/355 R; 428/475.2; 428/478.2; 428/480; 428/910; 427/171; 427/172; 427/173; 427/331; 427/407.1; 427/412.5; 427/414; 528/293; 528/294; 528/295
[58] Field of Search .............................. 428/353, 353 R, 428/355 N, 480, 482, 910, 216, 214, 215, 336, 339, 475.2, 478.2; 427/331, 407.1, 171, 172, 173, 412.5, 414; 528/293, 294, 295

[56] References Cited

U.S. PATENT DOCUMENTS

| | | | |
|---|---|---|---|
| 5,391,429 | 2/1995 | Otani et al. | 428/327 |
| 5,453,326 | 9/1995 | Siddiqui | 428/474.4 |
| 5,567,475 | 10/1996 | Hazen et al. | 427/221 |
| 5,770,301 | 6/1998 | Murai et al. | 428/213 |

FOREIGN PATENT DOCUMENTS

| | | |
|---|---|---|
| 59-102919 | 6/1984 | Japan . |
| 3-124737 | 5/1991 | Japan . |

*Primary Examiner*—Vivian Chen

[57] ABSTRACT

An oriented polyester film coated on at least one surface with a coating that improves its adhesion to gelatin is disclosed. The dry coating contains one or more sulfopolyesters; one or more tetrablock copolymer resins; and one or more non-volatile polyamines. Other ingredients, such as particulate materials and surfactants, may be present in the coating. The coating is preferably applied at the interdraw stage.

15 Claims, No Drawings

INTERDRAW PRETREATMENT FOR POLYESTER FILM

FIELD OF THE INVENTION

This invention relates to a polyester films. In particular, this invention related to an oriented polyester film coated on at least one surface with a coating that improves its adhesion to gelatin.

BACKGROUND OF THE INVENTION

Films of polymeric linear polyesters have excellent draw orientation and have proved especially well suited for biaxial film orientation. These polymeric films, especially those of polyethylene terephthalate or PET, are strong and have excellent inherent chemical and thermal properties. In addition, they have good optical clarity, toughness, and static properties, which makes them extremely suitable for use in photographic and reprographic applications.

In these applications the polymeric film is laminated with a layer of gelatin. However, unprimed polyester film is not very receptive to coating with gelatin. Adhesion between the hydrophobic unprimed polyester film and the hydrophilic gelatin is poor. Although coating that improve the adhesion of gelatin to polyester, such as the vinylidene polymers disclosed in U.S. Pat. No. 2,698,240, there is a continuing need for materials that will improve the adhesion of gelatin to polyester.

SUMMARY OF THE INVENTION

The invention is a coated polyester film comprising:

(a) an oriented polyester film, said film comprising a first surface and a second surface, and (b) a coating on at least one of said surfaces of said film, said coating comprising:

(1) about 85% by weight to about 98% by weight of one or more sulfopolyesters;

(2) about 0.5% by weight to about 5% by weight of one or more tetrablock copolymer resins; and (3) about 2% by weight to about 12% by weight of one or more non-volatile polyamines;

in which % by weight of the sulfopolyester or sulfopolyesters, tetrablock copolymer resin or resins, and non-volatile polyamine or polyamines is based on the total of the weight of the sulfopolyesters, the weight of the tetrablock copolymer resins, and the weight of the non-volatile polyamines present in the coating; and the coating has a thickness of about 0.05 to about 0.40 microns.

In another embodiment, the invention is a method for coating a polyester film.

DETAILED DESCRIPTION OF THE INVENTION

The invention is a polyester film coated on at least one surface with a coating that improves adhesion of the polyester film to gelatin. The coating is preferably applied at the interdraw stage of polyester manufacture. The coated polyester film of the invention has excellent adhesion to gelatin containing layers.

Polyester Film

Polyester films are well known to those skilled in the art. Preferred polyester films are those of the group consisting of polyethylene terephthalate (PET) film and polyethylene naphthanate film. The most preferred polyester film is polyethylene terephthalate.

The polymer preparation and film manufacturing processes are well known to those skilled in the art and are disclosed in many texts, such as *Encyclopedia of Polymer Science and Engineering,* 2nd. Ed., Vol. 12, Wiley, New York, pp. 1–313, as well as in numerous patents, such as UK Patent 838,708. The polymer is typically obtained by condensing the appropriate dicarboxylic acid or its lower alkyl diester with ethylene glycol. Polyethylene terephthalate is formed from terephthalate acid; polyethylene naphthanate is formed from 2,7-naphthalene dicarboxylic acid.

The thickness of polyester film is not critical and should be appropriate for the intended application for the coated polyester film. The thickness of the polyester film is generally less than about 250 microns, typically less than about 175 microns, preferably less than 50 microns, and more preferably between 12 to 25 microns.

Coating

The coating, sometimes referred to as a primer layer or primer coating, comprises a sulfopolyester, a tetrablock copolymer resin, and a non-volatile amine. Other ingredients may be included in the coating for a specific use.

Sulfopolyesters Sulfopolyesters are polyester resins containing free sulfonate groups. By free sulfonate group is meant a group of the formula —$SO_3R$, in which R is hydrogen, ammonium, substituted ammonium, or an alkali metal, such as lithium, sodium, or potassium, and in which the sulfonate group does not participate in the condensation or ester-exchange reaction by which the sulfopolyester is formed. Sulfopolyesters are described in "Sulfopolyesters: New Resins for Water-Based Inks, Overprint Lacquers, and Primers," K. R. Barton, Eastman Chemical Company publication No. SPI-13.

Formation of sulfopolyesters in conveniently effected by conventional condensation or ester-interchange, at temperatures up to about 275° C., in the presence of an acid catalyst. At least one sulfonated polycarboxylic acid, or its anhydride or lower alkyl, preferably methyl, ester, is reacted with a polyhydric alcohol. Reaction of a dicarboxylic acid, or its anhydride or lower alkyl, preferably methyl, ester, with a dialcohol to form a linear polyester is preferred. Preferably, at least one unsulfonated polycarboxylic acid, preferably dicarboxylic acid, or its anhydride or lower alkyl, preferably methyl, ester, is also present. Preparation of sulfopolyester resins is disclosed in U.S. Pat. No. 3,734,874.

Sulfopolyester resins are sold by the Eastman Chemical Company as Eastek® resins. Eastek® resins of the 1000, 1100, 1200, 1300, and 2100 series can be used in the coating composition. Eastek® 1300 resins are preferred. Suitable sulfopolyester resins include the ammonium and alkali metal, preferably sodium, salts.

Polyfunctional Block Copolymers The coating composition comprises a polyfunctional block copolymer derived from sequential addition of propylene oxide and ethylene oxide to a polyamine. Tetra-functional block copolymers derived from sequential addition of propylene oxide and ethylene oxide to ethylene diamine are preferred. Block co-polymers in which the ethylene oxide blocks are formed first, and thus are attached to the amine, are preferred. These polymers are marketed as Tetronic® R surfactants (BASF, Parsippany, N.J.). A preferred tetra-functional polyfunctional block copolymer is Tetronic® 90R4 surfactant, has a molecular weight of 7240.

These polymers promote wet adhesion between gelatin and the polyester film in the presence of amine catalysts.

They also comprise both hydrophobic and hydrophilic groups, thus maintaining the interface between gelatin and the polyester film in the presence of water.

Non-Volatile Polyamines A variety of non-volatile polyamines can be used as condensable catalysts to promote adhesion when a gelatin layer is applied to the film. A non-volatile polyamine is one that has more than one amino group and that will not be lost during the coating and subsequent drying and drawings steps.

Non-volatile polyamines, such as triaminononane and polyethylenimine, are preferred. Good wet adhesion is obtained due to diffusion and crosslinking when these amines are present in the coating. Although being not bound by any theory, it is believed that the highly branched polyethylenimines, which contain primary, secondary, and tertiary amine functionality, not only act as a catalysts, but also react with acidic components of the gelatin, such as glutamic acid and aspartic acid, to strengthen the interface between the gelatin and the coating. Polyethylenimines are available from BASF under the tradename Lupasol™ polyethylenimines.

High molecular weight non-volatile polyamines can also be used either alone or in combination with other, lower molecular weight polyamines to improve bonding of the gelatin to the polyester film. High molecular weight non-volatile polyamines include, for example, high molecular weight ($W_n$ of about 30,000 or greater) polyethylenimines, such as Lupasol™ P polyethylenimine, and high molecular weight polyamido-polyethylenimines, such as Lupasol™ SKA modified high molecular weight polyethylenimine. Polyamido-polyethylenimines differ from unmodified polyethylenimines in that at least about 20–25% and, preferably, about 100%, of the primary amine groups of the polyethylenimine are substituted with N-acetyl ($NHCOCH_3$) groups. These high molecular weight polyamines are available from BASF. Use of polyamido-polyethylenimines in coatings for polyester films has been disclosed in Siddiqui, U.S. Pat. No. 5,453,326, incorporated herein by reference.

Other Components The coating composition may also include other ingredients including additives that may further enhance the utility of the coating. Such ingredients include minor amounts of: particulate materials; dyes; pH regulating agents; anti-oxidants; anti-static agents; ultraviolet stabilizers; surfactants; and the like.

An effective amount of a finely divided particulate material, or pigment, may be added to improve the slip properties of the coated polyester film. These particles also increase both the surface roughness and surface area of the polyester film, which enhances its surface adhesion with the gelatin coatings. Inorganic pigments include, for example, clay, chalk, talc, magnesium carbonate, zinc oxide, titanium dioxide, barium sulfate, calcium carbonate, glass, and silica. Organic pigments include fine particles of, for example, cross-linked polystyrene, cross-linked polyvinyl chloride, and cross-linked acrylic polymers and co-polymers, such as cross-linked polymethyl methacrylate.

For photographic and other applications in which a transparent polyester film is required, a material that does not affect the transparency of the polyester film, such as silica, should be used. Submicron sized amorphous fumed silica particles are preferred. For applications in which an opaque film is desired, pigments such as titanium dioxide and calcium carbonate may be used.

The coating may comprise an effective amount of one or more surfactants to improve dispersion of the components in the coating composition and to act as wetting agents to achieve good wetting and leveling when the coating composition is coated on the polyester film. Non-ionic surfactants are preferred. If ionic surfactants are used, the coating composition may be cloudy. Suitable surfactants include alcohol ethoxylates and ethyoxylated alkyl phenols. Ethyoxylated alkyl phenols are preferred non-ionic surfactants.

Composition of the Coating

The dry coating comprises: (1) about 85% by weight to about 98% by weight, preferably about 90% by weight to 95% by weight, of one or more sulfopolyesters; (2) about 0.5% by weight to about 5% by weight, preferably about 0.8% by weight to 3% by weight, of one or more tetrablock copolymer resins; and (3) about 2% by weight to about 12% by weight, preferably 3% by weight to 8% by weight, of one or more non-volatile polyamines. The percentages by weight of the sulfopolyester or sulfopolyesters, of the tetrablock copolymer resin or resins, and of the non-volatile polyamine or polyamines is based on the total of the weight of the sulfopolyesters, weight of the tetrablock copolymer resins, and weight of the non-volatile polyamines present in the coating.

Typically about 0.5% by weight to about 5% by weight of the total non-volatile amine is a high molecular weight non-volatile polyamines or polyamines. Typically about 2% by weight to about 7% by weight, based on the total weight of the layer, of particulate material is present in the layer. Typically about 1% by weight to about 5% by weight, based on the total weight of the layer, of surfactant is present in the layer.

Manufacture

In the typical manufacture of polyester film, polyester resin is melted and extruded as an amorphous sheet onto a polished revolving casting drum to form a cast sheet of the polymer. Thereafter, the cast sheet of polymer is heated to just above its glass transition temperature, 80° C. to 100° C. for polyethylene terephthalate, and is generally stretched or drawn in one or more directions. The film is typically stretched in two directions, the direction of extrusion (longitudinal direction) and perpendicular to the direction of extrusion (transverse direction) to produce a biaxially orientated film. The first stretching, which imparts strength and toughness to the film, conventionally ranges from about 2.0 to about 4.0 times its original length. Subsequent stretchings each also increase the size of the film about 2.0 to about 4.0 times. Generally, it is preferred to stretch first in the longitudinal direction and then in the transverse direction. The film is then heat set, generally at a temperature in the range of about 190° C. to 240° C. for polyethylene terephthalate, to lock in the strength, toughness, and other physical properties.

The coating composition is preferably applied before final drawing of the film. For a uniaxially drawn film, the coating composition is preferably applied during a predraw stage. For a biaxially orientated film, the coating composition is preferably applied during an interdraw stage, that is, after the film has been stretched in one direction, but prior to stretching in the orthogonal direction.

The coating if preferably applied "in line" by the manufacturer so that the customer obtains film that is ready to be coated with the desired gelatin containing layer or subcoat. Coating "off line" by the customer would require that customer have equipment to unwind the uncoated film, coat it, draw the coated film, and then rewind it, making off line coating time consuming and expensive.

The coating composition is conveniently applied to the polyester film as an aqueous dispersion. Application from an aqueous medium is economically advantageous, avoids the potential explosion and/or toxicity hazards often associated with the use of volatile organic solvents, and eliminates the problem of residual odor frequently encountered when an organic solvent is used.

A sulfopolyester with a relatively high sulphonate content can generally be dispersed in hot water alone. However, if the sulfopolyester does not disperse in hot water unaided, dispersion can normally be accomplished by addition of a suitable surfactant. It may be advantageous to dissolve the sulfopolyester in a small amount of organic solvent prior to dispersion in water.

The coating composition typically comprises about 4% to 12% total solids. As is well known to those skilled in the art, total solids refers to the total amount of non-volatile material in the coating composition, even though some of these materials may be non-volatile liquids at room temperature.

Any conventional coating method, such as spray coating, roll coating, slot coating, meniscus coating, immersion coating, wire-bar coating, air knife coating, curtain coating, doctor knife coating, direct and reverse gravure coating, and the like, can be used to coat the coating composition. Once the coating has dried, the coated surface is receptive to gelatin without further treatment. The coating is typically applied as a continuous coating. The wet coating preferably has a thickness of about 6.5 to about 7.5 microns, as measured by wet infrared gauge. After drying, the coating typically has a thickness of about 0.05 micron to about 0.4 micron, preferably, about 0.1 micron to about 0.2 micron, more preferably about 0.12 micron to about 0.18 micron. The most preferred thickness is 0.15 micron to 0.17 micron.

Depending on the intended application for the polyester film, the coating may be applied to one or both sides of the film. In some applications, such as, for example, X-ray recording film, a gelatin coating is applied to each side of the film. If the coating is only applied to one side, a different coating may be applied to the other side.

The coating composition may be applied as an aqueous dispersion at a concentration and amount sufficient to produce a coating with the desired adherence properties. The coating composition typically contains about 3% to about 20% total solids, preferably about 4% to about 18% total solids. As is well known to those skilled in the art, "total solids" refers to the amount of non-volatile material present in the coating composition even though some of the non-volatile material present may be a liquid at room temperature.

INDUSTRIAL APPLICABILITY

The coating of the invention improves the adhesion of gelatin to a polyester film, especially to a polyethylene terephthalate film. The coated polyester film of the invention is useful in any application in which it is desired to coat a gelatin-containing layer onto a polyester film. Gelatin layers containing light-sensitive silver halide emulsions are coated onto polyester films in the preparation of photographic and X-ray film. The gelatin-containing layer may be coated directly on the coating of the invention or a gelatin subcoat may be coated on the coating of the invention before additional layers are coated on the polyester film. The coated polyester film can also be used in reprographic applications in which it is desired to coat a gelatin-containing layer onto a polyester film.

The advantageous properties of this invention can be observed by reference to the following examples which illustrate, but do not limit, the invention.

| Glossary | |
|---|---|
| Eastek ® 1300 | Sulfopolyester (Eastman Chemical Co., Kingsport, TN) |
| Lupasol ™ FG | Low molecular weight polyethylenimine homopolymer, 98% solids; viscosity = 2,000 to 10,000 cps; $M_w$ = 800; $M_n$ = 600 (BASF, Parsippany, NJ) |
| Lupasol ™ P | High molecular weight polyethylenimine homopolymer, 50% solids; viscosity = 18,000 to 40,000 cps; $M_w$ = 750,000; $M_n$ = 60,000 (BASF, Parsippany, NJ) |
| Lupasol ™ SKA | Modified high molecular weight polyethylenimine, about 20% solids; viscosity = 500 to 1,000 cps; $M_w$ = 2,000,000 (BASF, Parsippany, NJ) |
| OX-50 | Amorphous fumed silica (Degussa, Ridgefield Park, NJ) |
| Renex ® 690 | Nonoxynol-10 nonionic surfactant (ICI Americas, Wilmington, DE) |
| Tetronic ® 90R4 | Tetra-functional block copolymer derived from sequential addition of propylene oxide and ethylene oxide to ethylene diamine; MW = 7,240; viscosity = 3,870 cps; mp = 12° C. (BASF, Parsippany, NJ) |

EXAMPLE 1

This example illustrates a procedure for making a coating composition and coating a polyethylene terephthalate film.

Eastek® 1300 (43.6 L) was added to a 55 gallon mixing tank and agitation begun. De-ionized water was added under agitation for efficient mixing to bring the contents of the tank to the 25 gal mark. The following materials were added onto the resulting dispersion in the order given: 800 mL of Lupasol™ FG (neat), 40 mL of Lupasol™ L (neat), 40 mL of Tetronic® 90R4, 1.46 L of OX-50 (32% in ethylene glycol), and 1.9 L of Renex® 690 (20% solution in water). De-ionized water was added under agitation to bring the contents of the tank to the 50 gal mark and the resulting dispersion stirred for an additional 15 min. The resulting coating composition contained 8.7% total solids.

The coating composition was used for an interdraw coating during the manufacture of a polyethylene terephthalate film. The wet coating thickness, measured by an infra-red gauge, was 6.5 to 7.5 microns. The dry coating thickness was 0.16 micron. The dry coating contains 87.8% by weight Eastek® 1300, 4.7% by weight Lupasol™ FG, 0.12% by weight Lupasol™ P, 1.2% by weight Tetronic® 90R4, 3.6% by weight OX-50, and 2.4% by weight Renex® 690.

EXAMPLE 2

This example illustrates a procedure for making a coating composition and coating a polyethylene terephthalate film. The procedure of Example 1 was repeated, except that 800 mL of triaminononane (10% solution) was used in place of the Lupasol™ FG and 40 mL of Lupasol™ SKA (1% solution) was used in place of the Lupasol™ P. The resulting coating composition contained 8.7% total solids.

The resulting coating composition was used as an interdraw coating during the manufacture of a polyethylene terephthalate film. The wet coating thickness, measured by an infra-red gauge, was 6.5 to 7.5 microns. The dry coating thickness was 0.16 micron. The dry coating weight was 0.024 g/m$^2$.

EXAMPLE 3

This example illustrates a procedure for making a coating composition and coating a polyethylene terephthalate film. The procedure of Example 1 was repeated, except that 40 mL of Lupasol™ SKA (1% solution) was used in place of the Lupasol™ P. The resulting coating composition contained 8.6% total solids.

The resulting coating composition was used for an inter-draw coating during the manufacture of a polyethylene terephthalate film. The wet coating thickness, measured by an infra-red gauge, was 6.5 to 7.5 microns. The dry coating thickness was 0.16 micron. The dry coating weight was 0.024 g/m$^2$.

EXAMPLE 4

This example illustrates a procedure for making a coating composition and coating a polyethylene terephthalate film.

Eastek® (21.8 L) was added to a 55 gallon mixing tank and agitation begun. De-ionized water was added under agitation for efficient mixing to bring the contents of the tank to the 25 gal mark. The following materials were added to the resulting dispersion in the order given: 400 mL of Lupasol™ FG (10% solution), 40 mL of Lupasol™ P (1% solution), 20 mL of Tetronic® 90R4, 0.73 L of OX-50 (32% in ethylene glycol), and 1.9 L of Renex® 690 (20% solution in water). De-ionized water was added under agitation to bring the contents of the tank to the 50 gal mark and the resulting dispersion stirred for an additional 15 min. The resulting coating composition contained 4.5% solids. The dry coating contains 87.8% by weight Eastek® 1300, 4.7% by weight Lupasol™ FG, 0.12% by weight Lupasol™ P, 1.2% by weight Tetronic® 90R4, 3.6% by weight OX-50, and 2.4% by weight Renex® 690.

The resulting coating composition was used for an inter-draw coating during the manufacture of a polyethylene terephthalate film. The wet coating thickness, measured by an infra-red gauge, was 6.5 to 7.5 microns. The dry coating thickness was 0.08 micron. The dry coating weight was 0.012 g/m$^2$.

EXAMPLE 5

This example illustrates a procedure for making a coating composition and coating a polyethylene terephthalate film.

Eastek® (87.2 L) was added to a 55 gallon mixing tank and agitation begun. De-ionized water was added under agitation for efficient mixing to bring the contents of the tank to the 25 gal mark. The following materials were added to the resulting dispersion in the order given: 1600 mL of Lupasol™ FG (10% solution), 80 mL of Lupasol™ P (1% solution), 80 mL of Tetronic® 90R4, 2.92 L of OX-50 (32% in ethylene glycol), and 1.9 L of Renex® 690 (20% solution in water). De-ionized water was added under agitation to bring the contents of the tank to the 50 gal mark and the resulting dispersion stirred for an additional 15 min. The resulting coating composition contained 16.2% solids.

The resulting coating composition was used for an inter-draw coating during the manufacture of a polyethylene terephthalate film. The wet coating thickness, measured by an infra-red gauge, was 6.5 to 7.5 microns. The dry coating thickness was 0.32 micron. The dry coating weight was 0.048 g/m$^2$.

Having described the invention, we now claim the following and their equivalents.

What is claimed is:

1. A coated polyester film comprising:
   (a) an oriented polyester film, said film comprising a first surface and a second surface, and in order;
   (b) a first coating on at least one of said surfaces of said film, said coating comprising:
      (1) about 85% by weight to about 98% by weight of one or more sulfopolyesters derived from the reaction of a polyhydric alcohol with (i) at least one sulfonated polycarboxylic acid or its anhydride or lower alkyl ester and (ii) at least one unsulfonated polycarboxylic acid or its anhydride or lower alkyl ester;
      (2) about 0.5% by weight to about 5% by weight of one or more tetrablock copolymer resins derived from the sequential addition of ethylene oxide and then propylene oxide to ethylene diamine; and
      (3) about 2% by weight to about 12% by weight of one or more non-volatile polyamines, wherein said one or more nonvolatile polyamines comprise about 0.5% by weight to about 5% by weight, based on the total weight of the one or more non-volatile polyamines, of a high molecular weight non-volatile polyamine or polyamines, wherein the % by weight of the sulfopolyester or sulfopolyesters, the tetrablock copolymer resin or resins, and the non-volatile polyamine or polyamines is based on the total weight of the one or more sulfopolyesters, the weight of the one or more tetrablock copolymer resins, and the weight of the one or more non-volatile polyamines present in the coating; and the coating has a thickness of about 0.05 to about 0.4 microns; and
   (c) a second coating comprising a layer of hydrophilic gelatin.

2. The coated film of claim 1 in which the polyester film is selected from the group consisting of polyethylene terephthalate film and polyethylene naphthalate film.

3. The coated film of claim 2 in which the first coating additionally comprises a finely divided particulate material.

4. The coated film of claim 3 in which the film is polyethylene terephthalate film.

5. The coated film of claim 4 in which the first coating has a thickness of about 0.1 micron to about 0.2 micron.

6. The coated film of claim 5 in which the first coating has a thickness of about 0.12 micron to about 0.18 micron.

7. The coated film of claim 2 comprising the first coating on the first surface and the second surface of the film.

8. The coated film of claim 2 in which the coating comprises: about 90% by weight to 95% by weight of the one or more sulfopolyesters; about 0.8% by weight to 3% by weight of the one or more tetrablock copolymer resins; and 3% by weight to 8% by weight of the one or more non-volatile polyamines.

9. The coated film of claim 8 in which the first coating additionally comprises a finely divided particulate material.

10. The coated film of claim 9 in which the film is polyethylene terephthalate film.

11. The coated film of claim 10 in which the first coating has a thickness of about 0.1 micron to about 0.2 micron.

12. The coated film of claim 11 in which the first coating has a thickness of about 0.12 micron to about 0.18 micron.

13. The coated film of claim 12 in which the first coating additionally comprises a surfactant.

14. A method of preparing a coated polyester film comprising coating a first coating composition onto the polyester film at the interdraw stage, said coating composition comprising:

(1) about 85% by weight to about 98% by weight of one or more sulfopolyesters derived from the reaction of a polyhydric alcohol with (i) at least one sulfonated polycarboxylic acid or its anhydride or lower alkyl ester and (ii) at least one unsulfonated polycarboxylic acid or its anhydride or lower alkyl ester;

(2) about 0.5% by weight to about 5% by weight of one or more tetrablock copolymer resins derived from the sequential addition of ethylene oxide and then propylene oxide to ethylene diamine; and (3) about 2% by weight to about 12% by weight of one or more non-volatile polyamines, wherein said one or more nonvolatile polyamines comprise about 0.5% by weight to about 5% by weight, based on the total weight of the one or more non-volatile polyamines, of a high molecular weight non-volatile polyamine or polyamines, wherein the % by weight of the sulfopolyester or sulfopolyesters, the tetrablock copolymer resin or resins, and the non-volatile polyamine or polyamines is based on the total weight of the one or more sulfopolyesters, the weight of the one or more tetrablock copolymer resins, and the weight of the one or more non-volatile polyamines present in the coating, and the coating composition comprises about 4% by weight to about 12% by weight total solids, followed by coating a second coating composition comprising a layer of hydrophilic gelatin.

15. The method of claim 14 in which the film is polyethylene terephthalate film.

* * * * *